Patented Mar. 11, 1952

2,588,920

UNITED STATES PATENT OFFICE 2,588,920

METHOD OF APPLYING A VITREOUS COATING COMPOSITION TO A GLASS BASE AND ARTICLE RESULTING THEREFROM

Robert L. Green, Schenectady, N. Y., assignor to General Electric Company, a corporation of New York No Drawing. Application January 29, 1947, Serial No. 725,169

3 Claims. (Cl. 117—65)

The present invention relates to electrical discharge devices, electric insulators and other devices in the electrical field on which for various reasons superficial electrically conducting coatings of predetermined high resistivity are desired.

My invention is applicable, for example, to the fabrication of high voltage types of electronic discharge devices comprising tubular envelope members on the surface of which it is desired to produce sufficient conductivity to dissipate undesired electric charges or to uniformly distribute an electric field.

It has been proposed heretofore to provide glass bodies with conducting surfaces by applying to foundation glasses relatively thin superficial conducting layers of high resistance material. However, the predetermination of the resistivity of such layers heretofore has caused considerable difficulty and the resistivity of such layers has not always been as constant as desired. In a copending application, Serial No. 724,961, now abandoned, filed January 29, 1947, by Katharine B. Blodgett, of which copending application Serial No. 84,466, filed March 30, 1949 is a continuation, there are described composite glass articles which are provided with coatings of various glass having a lead oxide content of about 60 to 85%, modified by chemical reduction to develop conductivity.

My present invention provides improved glass compositions which are particularly well adapted upon being subjected to reducing conditions to develop controllably wide ranges of electrical conductivity. Glasses embodying my invention contain in chemical combination both lead and one or more metals chosen from the 5th subgroup of the Periodic System, in particular, antimony and bismuth.

In carrying out my invention glass-forming ingredients, such as silica, boric anhydride, lead oxide are associated prior to fusion with a quantity of the chosen oxide of a 5th group metal.

The following examples of glass compositions illustrate my invention.

| Oxide Constituents | Parts by Weight | | |
|---|---|---|---|
|  | Comp. No. 1 | Comp. No. 2 | Comp. No. 3 |
| $SiO_2$ | 25 | 15 | 40 |
| $PbO$ | 20 | 60 | 20 |
| $Sb_2O_3$ | 55 | 25 | 40 |

Glasses made from such constituents by fusion in the usual manner known in the glass making art, may be applied in finely comminuted state as a coating on a foundation glass which may be a borosilicate glass or a soda-lime glass. The article, after coating, is baked in hydrogen or other reducing gas at elevated temperatures for about one-half hour. In some cases a plurality of coatings about a half mil in thickness may be applied. The resistivity of the resulting conducting coating on the foundation glass will vary with the thickness of the layer and the composition. The range of resistivity thus obtained will vary within wide limits depending on the temperature of reduction. For example, a glass made from Composition No. 1 when heated in hydrogen at a temperature of 308° C. will have a resistivity of $20.2 \times 10^6$ ohms per square.

The same glass when heated in hydrogen to 395° C. has a resistivity of $8.2 \times 10^6$ ohms per square. A glass prepared from Composition No. 2 when heated in hydrogen has resistivities varying from $2.6 \times 10^3$ to $1.2 \times 10^7$ ohms per square and a glass prepared in accordance with Composition No. 3 has resistivities varying from $5 \times 10^8$ to $9.5 \times 10^9$ depending on the temperature of baking in reducing gas.

A wide range of glass compositions and physical properties, including subsequent electrical resistivity on reduction, is afforded by the $PbO$—$Bi_2O_3$ system.

Typical examples are:

| Glass No. | 4 | 5 | 6 | 7 | 8 | 9 | 10 |
|---|---|---|---|---|---|---|---|
| $SiO_2$ | 25 |  | 25 | 25 | 25 | 45 | 40 |
| $B_2O_3$ |  | 25 |  | 10 |  |  |  |
| $PbO$ | 25 | 25 | 50 | 50 | 45 | 25 | 25 |
| $Bi_2O_3$ | 50 | 50 | 25 | 15 | 25 | 25 | 25 |
| $Na_2O$ |  |  |  |  | 5 | 5 |  |
| $BaO$ |  |  |  |  |  |  | 10 |
| Res. in ohms/sq | $2.9 \times 10^3$ to $1.4 \times 10^4$ | $1.2 \times 10^4$ to $7.0 \times 10^6$ | $3 \times 10^3$ to $5 \times 10^4$ | $5.5 \times 10^5$ to $1 \times 10^9$ | $6 \times 10^6$ to $2 \times 10^7$ | $2.6 \times 10^9$ to $6 \times 10^{10}$ | $3.3 \times 10^8$ to $1.2 \times 10^{10}$ |

The range of composition in this field consists of:

| | Percent |
|---|---|
| $SiO_2$ | 0–55 |
| $B_2O_3$ | 25–0 |
| $PbO$ | 75–25 |
| $Bi_2O_3$ | 50–15 |
| $Na_2O$ | 0–5 |
| $BaO$ | 0–10 |
| $ZrO_2$ | 0–5 |

The resistivities vary in the range of $2.9 \times 10^3$ to $6 \times 10^{10}$ ohms per square of surface.

In a glass embodying my invention, I believe the electrical current to be conducted by chains of metallic atoms extending throughout the volume and over the surface of the reduced glass. Only thin external layers of the glass are reduced, due to the limited penetration of the reduced gases into the body of the glass. The glass coating which contains oxide selected from the group consisting of the oxides of antimony and bismuth has formed thereon a thin external layer of a reduced glass having lower electric resistivity (higher conductivity) than underlying portions of glass coating, that is portions beneath such external layer. The reduction temperature should be kept sufficiently low (below 400° C.) so that there is no aggregation of metallic atoms which would interrupt the conducting chains.

What I claim as new and desire to secure by Letters Patent of the United States is:

1. The method of rendering slightly conductive the surface of a glass article which comprises applying to said article a coating of finely comminuted glass in which is incorporated from 25% to 75% by weight of lead oxide and 25% to 50% by weight of a member selected from the group consisting of antimony oxide and bismuth oxide, and heating said coated article in a reducing atmosphere to a fusion temperature within the range of 308° C. to 395° C. for a period of the order of one-half hour.

2. The method of rendering the surface of a glass article slightly conductive as set forth in claim 1 wherein the selected member is bismuth oxide.

3. A surface conducting glass article produced by the method of claim 1.

ROBERT L. GREEN.

REFERENCES CITED

The following references are of record in the file of this patent:

UNITED STATES PATENTS

| Number | Name | Date |
|---|---|---|
| 1,884,665 | Greiner | Oct. 25, 1932 |
| 2,118,795 | Littleton | May 24, 1938 |
| 2,194,784 | Berger | Mar. 26, 1940 |
| 2,233,622 | Lytle | Mar. 4, 1941 |
| 2,339,928 | Hood | Jan. 25, 1944 |